Oct. 21, 1958     P. A. GROBEY ET AL     2,856,693
GAGE ELEMENT FASTENING MEANS
Filed July 20, 1954
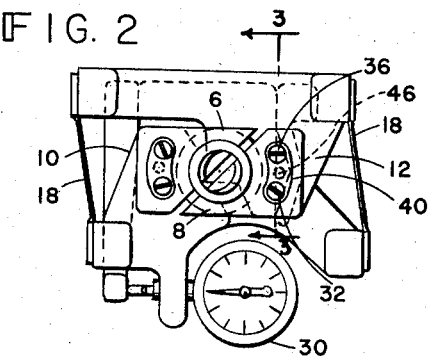
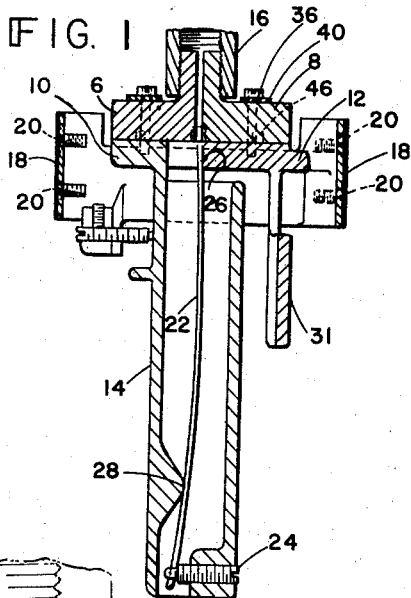
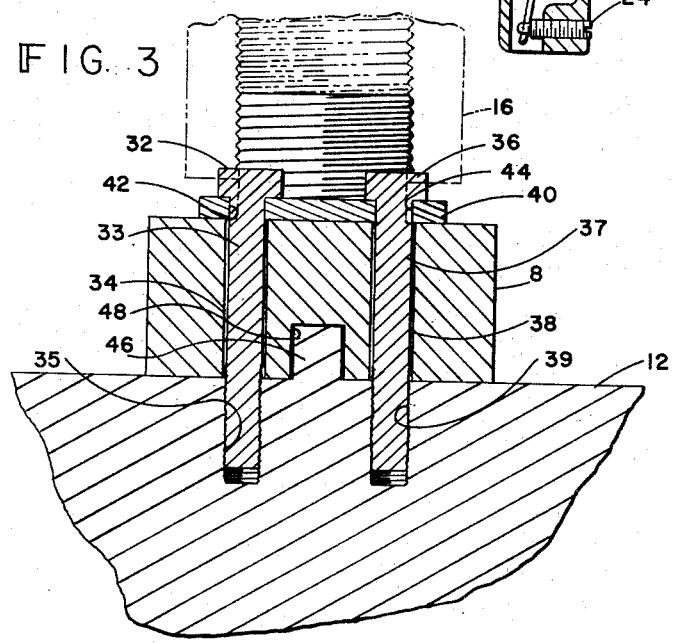

United States Patent Office
2,856,693
Patented Oct. 21, 1958

2,856,693

GAGE ELEMENT FASTENING MEANS

Paul A. Grobey, Springfield, and Jeffrey M. Cargill, Weathersfield Bow, Vt., assignors, by mesne assignments, to Ex-Cell-O Corporation, Detroit, Mich., a corporation of Michigan Application July 20, 1954, Serial No. 444,412

1 Claim. (Cl. 33—143)

This invention relates to gages for measuring either internal or external diameters and more particularly to novel means for removably attaching gage elements to such gages.

In U. S. Patent No. 2,588,820 is shown and described a gage having a pair of relatively movable members with pads for supporting gaging elements, said elements each being attached to said pads by means of a pair of countersunk machine screws passing through the gaging elements into threaded bores in said pads. Although such structure adequately serves to hold the gaging elements in fixed position, it has been found difficult to assemble such gaging elements and their respective supports and to aline them to a master gage with the requisite accuracy. We have found, however, that this difficulty is apparently due to the twisting force exerted on a gage element when one of its pair of attaching screws is tightened after the master gage setting is established, such twisting force tending to swing the gaging element about the other screw as a center and cause misalinement of the gage elements and necessitating their readjustment.

Accordingly, it is an object of the present invention to provide a gage element mounting means free from the above-mentioned difficulties, and one which is readily assembled and facilitates the necessary setting of gage elements to a master gage after such assembly without danger of misalinement upon tightening of the gage element fastening screws, as heretofore.

For a complete understanding of further objects and features of this invention, reference is made to the following description of a preferred embodiment thereof together with the accompanying drawings, in which:

Fig. 1 is a side cross-sectional elevational view of an internal gage embodying the invention;

Fig. 2 is a top plan view of the gage of Fig. 1; and

Fig. 3 is an enlarged side elevational cross-sectional view of the gage of Fig. 1 taken on the line 3—3 of Fig. 2.

Referring to the drawings, at 10 and 12 are shown two relatively movable support members having upper pad surfaces for supporting removable gage elements 6 and 8 thereon, said support members comprising a support member 10 having a longitudinally extending hollow handle 14 and a support member 12 movable relative thereto. The support members are supported for movement in a plane toward and away from one another for engagement with the sides of a workpiece 16 by means of reeds 18 mounted on the support members by machine screws 20 and connecting the ends of support members 10 and 12. These reeds 18 are of substantial width thus to afford substantial resistance to relative motion of the members longitudinally of the axis of the gage elements 6 and 8 but permitting the gaging elements to be moved toward and away from one another in a direction perpendicular to said axis in a single plane and in a substantially rectilinear direction. A leaf spring 22 is housed within the hollow handle 14, one end of this spring being supported and restrained by the reduced end of a screw 24 fitted in a hole in the spring and the other end engaging against the edge 26 on the other support member 12; intermediate the ends of the spring 22 it bears against a fulcrum 28 on the inner surface of the handle 14. The spring 22 may be adjusted by screw 24 to balance the pressures of spring 22 and reeds 18. With this arrangement, the spring 22 urges the movable support member 12 to the right relative to the fixed support member 10, as viewed in Figs. 1 and 2. This direction of relative motion of the support members 10 and 12 is that required to move the gage elements into gaging position against the workpiece 16. A dial indicator 30 mounted on support member 10 with its actuating plunger bearing against relatively movable support member 12 is used in the usual manner to indicate variations in the displacement of support members 10 and 12 from that of a standard ring setting.

The gage may be operated to permit placing of the workpiece 16 thereon by pressing upon a fingerpiece 31 projecting downwardly from the movable support member 12; during this movement the support members with their gage elements are pressed toward each other to allow clearance enough for the internal threads of the workpiece to pass over the threads of the gage elements.

According to this invention, each of the gage elements 6 and 8 is removably mounted on an upper pad surface of support members 10 or 12, respectively, by means of a pair of machine screws having enlarged heads 32 and 36 with their shanks 33 and 37 passing through bores 34 and 38 in a gaging element and being received by tapped bores 35 and 39, respectively, in a support member, the bores 34 and 38 being substantially larger than the diameter of said machine screws to allow limited movement of a gage element relative to its support member prior to tightening of said machine screws but being generally alined with and concentric with said tapped bores 35 and 39. A flat sheet metal common connecting member 40 is provided between each of said pairs of machine screws, said connecting member 40 having bores 42 and 44 therein for receiving said machine screw shanks 33 and 37, respectively, said bores 42 and 44 fitting closely about said machine screw shanks to eliminate any rotary movement of said connecting member about one of said screws as a center as a screw head is tightened downwardly to press the flat plane under surface thereof against the upper surface of connecting member 40.

In order further to facilitate the assembly of gaging elements 6 and 8 on support members 10 and 12, each of said support members is provided on its upper surface midway between threaded bores 35 and 39 with an upstanding lug 46 adapted to fit loosely within an oversize recess 48 in the bottom surface of a gaging element midway between bores 34 and 38, such lug and recess cooperating to aid in the initial assembly of said elements on their support members, and yet being loosely fitting enough freely to allow the limited movement essential for alining the gage elements to a master gage.

In operation of the gage element mounting of the invention, the gage elements 6 and 8 are first placed on their respective support members 10 and 12 with lugs 46 on said support members loosely engaging recesses 48. Machine screws 33 and 37 are then passed through bores 42 and 44 of their common connecting member 40, next passed through bores 34 and 38, respectively, in said gage elements, and then screwed into their respective tapped bores 35 and 39 in the support members 10 and 12. With the gage elements so assembled with the machine screws free enough to permit some limited lateral movement of gage elements 6 and 8 relative to their supporting members 10 and 12, since said machine screw shanks are of smaller diameter than bores 34 and 38 for a loose fit therein, said gage elements may be alined by means of an internal threaded ring of a standard size by passing said ring over the gage elements 6 and 8 and allowing the spring 22 to press the elements into proper gaging engagement with the ring. The tolerance hands of the dial indicator 30 are then set to indicate the maximum plus and minus tolerance, and the indicating pointer of said dial indicator set to "0." After setting the gage, the machine screws may be tightened by screwing their heads 32 and 36 firmly against the upper surface of their common connecting member 40, such member, by reason of the close fit of the machine screw shanks 33 and 37 in bores 42 and 44 thereof, preventing movement of the gaging element caused by the friction of the under surface of a screw head rotating against it. Thus, since connecting member 40 cannot rotate, only straight clamping force is provided against the gage elements by tightening the screws and any misalinement necessitating resetting of the gaging elements is precluded.

It will be understood by those skilled in this art that other embodiments of our invention may be effectively employed as, for example, for external gaging without departing from the spirit of the invention or the scope of the appended claim.

We claim:

A gage comprising a pair of relatively movable support members each having a spaced pair of tapped bores therein, a gage element removably mounted on each of said supports, said gage element having therein a spaced pair of bores therein alined with said tapped bores in said support member, a screw member positioned in each of said gage element bores and engaging an alined tapped bore in said support member, said screw members each having an enlarged head portion with a flat under surface, a shank portion of substantially smaller diameter than that of said bores in said gage element and with a screw threaded end for engagement with said tapped bores, each of said shanks extending loosely through a bore in said gage element to provide limited lateral relative movement of said gage element on its supporting member, with said screw threaded end engaging said tapped bores in said support member, a flat sheet metal connecting member positioned on said gage element and extending between and connecting said pair of screw members, said connecting member having a pair of spaced bores therein alined with said bores in said gage element and closely fitting said screw shank portions, and being frictionally engaged by the flat under surface of said screw head portion to clamp said gage element against its support member while preventing movement of said gaging elements by friction of a screw head rotating thereagainst and an upstanding lug on each of said support members spaced midway between said threaded bores, and lug fitting loosely within a recess on a cooperating gage element to provide assembly alinement of said gage element on its support member.

References Cited in the file of this patent

UNITED STATES PATENTS

| | | |
|---|---|---|
| 1,292,654 | Seghers | Jan. 28, 1919 |
| 1,489,577 | Hanson | Apr. 8, 1924 |
| 1,660,335 | Johnson | Feb. 28, 1928 |
| 1,765,664 | Flath | June 24, 1930 |
| 1,798,698 | Rainey | Mar. 31, 1931 |
| 2,073,365 | Darlington | Mar. 9, 1937 |
| 2,104,194 | Glouton | Jan. 4, 1938 |
| 2,357,143 | Smith | Aug. 29, 1944 |
| 2,588,820 | Gates | Mar. 11, 1952 |
| 2,678,498 | Rimmel | May 18, 1954 |